Aug. 22, 1944.  W. M. McKENZIE  2,356,465
CHIP SEPARATOR
Filed Jan. 28, 1942
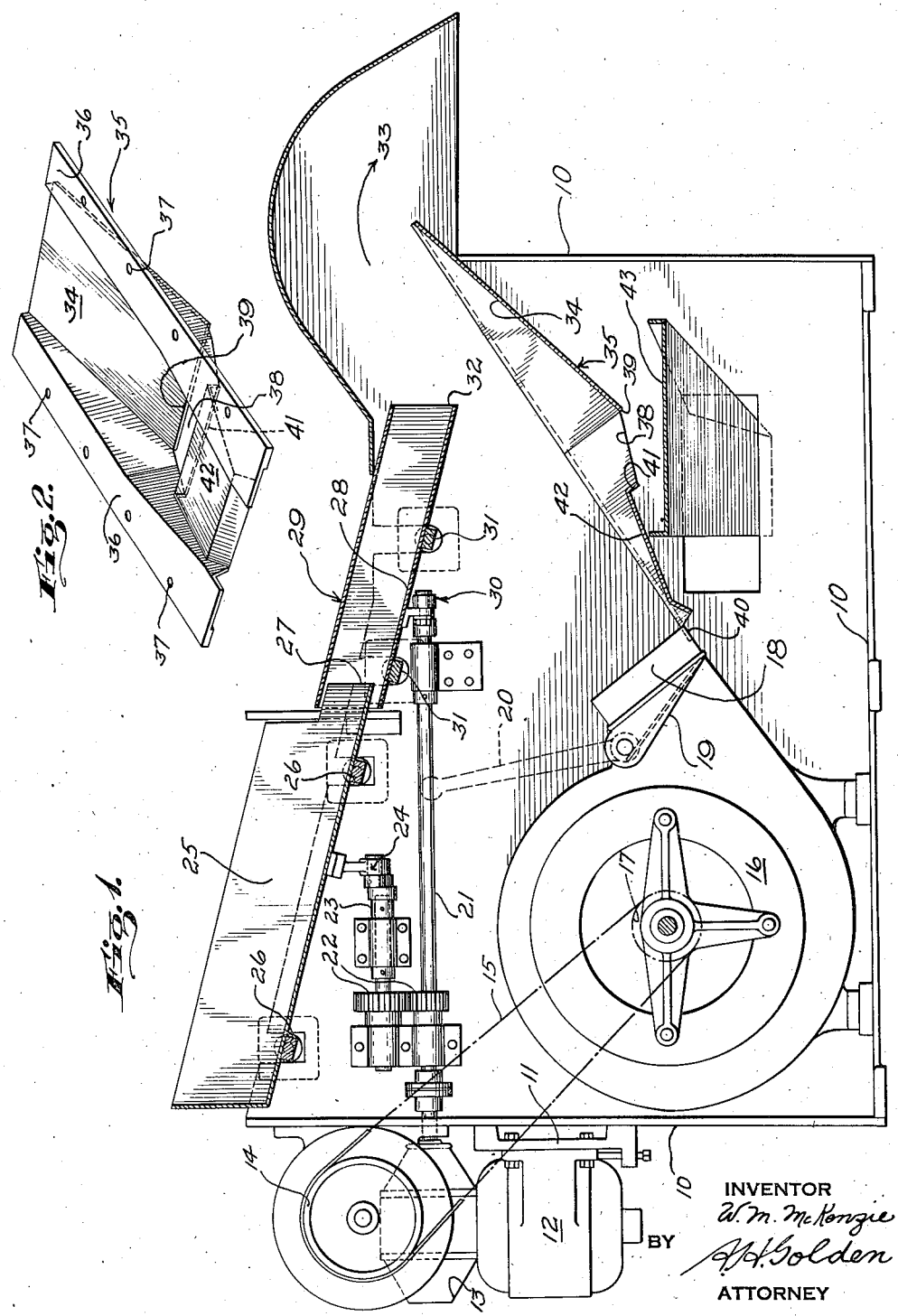
INVENTOR
W. M. McKenzie
BY
A. H. Golden
ATTORNEY Patented Aug. 22, 1944

2,356,465

UNITED STATES PATENT OFFICE 2,356,465

CHIP SEPARATOR

William M. McKenzie, Newtown, Conn.

Application January 28, 1942, Serial No. 428,470

2 Claims. (Cl. 209—136)

This invention relates to a separator of the type which is adapted to separate screw machine products from the metal chips which are accumulated with those products during the manufacturing process. It will of course be appreciated that the separator is adapted for separating finished products from chips accumulated therewith where the finished products are made by machines other than screw machines.

More particularly, my present invention is an improvement over the separator shown in my Patent No. 1,126,240 dated January 26, 1915, and my later Patent No. 1,781,790 dated November 18, 1930.

In separators of the type shown in my earlier patents, and in the present application, the finished products and chips to be separated therefrom, are adapted to be vibrated slowly to a point where they are dropped vertically into the path of an air blast which is generated by a blower. The air blast is so regulated, in accordance with the weight and form of the products and chips to be separated, that the chips are picked up by the air blast and carried to a point of deposit. The finished products are allowed to fall downwardly through the air blast onto what is termed a separator plate, and then slide down the separator plate toward a discharge opening therein through which they drop into a receptacle. The separator plate must be so located relatively to the air blast and the point at which the parts are dropped downwardly into the air blast, that the fall of the finished products will not be sufficient to damage those finished products. In addition, the sliding movement down the separator plate must be so calculated that the finished products will not acquire sufficient speed of movement to damage them. It is also important that the parts drop through an undeflected portion of the air blast issuing from the blower.

In the machines shown in my earlier patents, the separator plate is positioned parallel to the axis of the blower discharge pipe, that is, parallel to the air blast, and the surface on which the products slide toward the discharge opening of the separator plate forms, in effect, an extension of the lower surface of the discharge pipe. Under this arrangement, there is a tendency of some of the parts to overslide the discharge opening of the separator plate and enter the discharge pipe of the blower. To prevent such movement of the parts the discharge pipe is fitted with a relatively heavy screen, and such a screen is clearly shown in applicant's earlier patents. Those skilled in the art will fully appreciate that this screen is subjected to clogging so that the air blast is seriously affected after considerable usage of the machine. In addition, because this screen will clog from the inside as well as the outside, the intake side of the blower is also equipped with a screen to prevent the entrance of foreign material into the blower and against the blower pipe screen. The intake screen will of course clog even faster than the blower pipe screen and will therefore greatly decrease the amount of air which will be moved by the blower to effect the separation of the finished products from the chips.

It is a feature of my invention that I eliminate the screen at the blower intake and also at the blower pipe, by utilizing a novel construction of the separator plate, so that the separated products will not be allowed to overslide the discharge opening and into the open mouth of the blower pipe. This is accomplished without substantially increasing the speed of movement of the finished products down the separator plate, without withdrawing the finished products substantially from the air blast path, and without deflecting the air blast away from the direction imparted thereto by its blower pipe. In addition, the new separator plate which I utilize is adapted to allow for the movement of relatively long finished products down the separator plate into a suitable receptacle without requiring a large discharge opening in the separator plate.

I have thus described generally the construction of my machine, in order that the contribution which I have made to the art may be better understood. Naturally, the claims of the patent to be granted me should not be limited to the specific structure herein shown since other forms of my invention will readily occur to those skilled in the art.

Referring now to the drawing, Fig. 1 is a vertical section through my machine illustrating its parts. Fig. 2 is a perspective view of the new separator plate of my invention.

Referring now more particularly to the drawing, the frame of my machine is designated generally by reference numeral 10, and supports through a suitable bracket 11 an electric motor 12, which through suitable gearing 13 drives a pulley 14 about which is placed a belt 15 which drives the fan of the blower 16 through the pulley 17 of that blower. The air blast is directed through what I term a discharge pipe 18, and is adapted for regulation by a damper 19 whose position is set by a lever 20, in any suitable manner. At this point, it may be well to indicate that I shall not describe in detail the particular construction of the blower of my machine, and the means whereby the parts are fed toward and dropped into the air blast, since such means are fully set forth in my earlier patents, and in further view of the fact that the separator plate of my invention is adapted for cooperation with varying types of blowers and varying types of means whereby products and chips to be separated are fed to an air blast.

The gearing 13 is adapted to rotate the shaft 21, which through suitable gears 22 rotates the shaft 23. The shaft 23, through eccentric means designated generally by reference numeral 24, is adapted to impart vibration to a compartment 25 suitably mounted on bearing supports 26. When the compartment 25 is vibrated, the products and chips therein contained are fed slowly downwardly to the open mouth 27 of the compartment 25 and are dropped onto the plate 28 of a second vibrating compartment 29.

This second vibrating compartment 29 is vibrated by the shaft 21 through suitable eccentric means designated generally by reference numeral 30, and is mounted for this vibratory movement on suitable bearings 31. The parts and chips to be separated are thus fed downwardly on the plate 28 until they are dropped from the open end 32 of the compartment 29 into the air blast generated by the blower 16 as directed by its blower pipe 18.

As was indicated generally in the first part of this specification, the blast of air is so regulated by the damper 19 that the chips will be picked up and carried in the direction of the arrow 33 toward a suitable receptacle. The finished parts will drop downwardly through the air blast and will be deposited rather lightly by the air blast on the surface 34 of the separator plate which is designated generally by reference numeral 35. The separator plate 35 is preferably fabricated of sheet metal and takes the form best illustrated in Fig. 2. The flanges 36 are formed with a series of holes 37 whereby the separator plate is bolted to the machine in a manner which is not herein set forth in detail but which will be readily understood by those skilled in the art. The angular inclination of the separator plate 35 and its surface 34 is so determined that the discharge opening 38 of the separator is located with its forward terminal edge 39 defined by the end of the surface 34, offset relatively to the lowermost surface 40 of the blower pipe 18, so that parts sliding down the surface 34 cannot possibly enter the open end of the blower pipe.

Those skilled in the art will appreciate that I have arranged the surface 34 at the particular angularity shown in Fig. 1, so that my machine may be adapted for a great variety of products, and so that my machine may be utilized in many different industries. It will be appreciated by those skilled in the art that for certain products, the surface 34 need not have quite that angularity relatively to the axis of the blower pipe 18 which is illustrated in Fig. 1. It is sufficient for the operation of my invention with many types of parts, if the surface 34 has such angularity as will bring its edge 39 in offset relation to the surface 40 of the blower pipe 18, while the upper portion of the surface 34 is positioned to receive the parts as they pass through the air blast. The rearward terminal edge of the opening 38 is defined by the flange 41 which forms an extension of the surface 42. The lower edge of the flange 41 is so disposed relatively to the edge 39, as to present a considerable opening for parts sliding downwardly on the surface 34, so that even very long parts will readily be directed under the flange 41 and through the discharge opening 38 onto the member 43, which will guide the finished products to a suitable receptacle. It will also be appreciated that relatively swiftly moving parts may even impinge against the flange 41 so as to be slowed down and to be allowed to drop with lessened speed against the surface 43.

I believe that those skilled in the art will now fully appreciate the value of my new separator plate and the manner in which it functions to direct the finished products at a required speed towards a receptacle while preventing the movement of those products towards the blower in a manner set forth in the prior art. The true value of my invention may best be appreciated, when it is considered that by a very simple change in structure, I have been able to omit the rather troublesome screens which for many years were required by the prior art for the proper operation of machines of the class herein set forth, while not changing the essentially desirable operation of the prior art machines.

I now claim:

1. In a chip separator of the class described, a blower, a discharge pipe through which an air blast generated by said blower is directed through the open end of said discharge pipe, means for dropping parts and chips to be separated into the area of said air blast at a point displaced from the open end of said discharge pipe and above and to one side of the end of said pipe whereby the parts and chips may move through the entire unobstructed area of said discharge pipe, a separator plate for receiving the parts and chips after they have passed through the said air blast, said separator plate having an opening therein substantially below the axial extension of the open end of said discharge pipe, and plate portions forming said separator plate extending angularly upwardly from the forward and rearward edges of said separator plate opening towards the axial extension of the open end of said discharge pipe, substantially for the purpose described.

2. In a chip separator of the class described, a blower, a discharge pipe through which an air blast generated by said blower is directed through the open end of said discharge pipe, means for dropping parts and chips to be separated into the area of said air blast at a point displaced from the open end of said discharge pipe and above and to one side of the end of said pipe whereby the parts and chips may move through the entire unobstructed area of said discharge pipe, a separator plate for receiving the parts and chips after they have passed through the said air blast, said separator plate having an opening therein substantially below the axial extension of the open end of said discharge pipe, plate portions forming said separator plate extending angularly upwardly from the forward and rearward edges of said separator plate opening towards the axial extension of the open end of said discharge pipe, and the plate portion extending forwardly from said separator plate opening in the direction of the air blast defining the forward edge of said separator plate opening and lying below the rearward edge of said separator plate opening so that long parts may slide downwardly on said forward plate portion and below the rearward edge of said separator plate opening rather than into said discharge pipe.

W. M. McKENZIE.